(12) United States Patent
Akasaka (10) Patent No.: US 7,624,205 B2
(45) Date of Patent: Nov. 24, 2009

(54) MICROCONTROLLER

(75) Inventor: Nobuhiko Akasaka, Kawasaki (JP)

(73) Assignee: Fujitsu Microelectronics Limited, Tokyo (JP)

( * ) Notice: Subject to any disclaimer, the term of this patent is extended or adjusted under 35 U.S.C. 154(b) by 380 days.

(21) Appl. No.: 11/146,237

(22) Filed: Jun. 7, 2005

(65) Prior Publication Data
US 2006/0161697 A1 Jul. 20, 2006

(30) Foreign Application Priority Data
Jan. 14, 2005 (JP) ............................. 2005-007546

(51) Int. Cl.
*G06F 3/00* (2006.01)
*G06F 13/24* (2006.01)
*G06F 12/00* (2006.01)
(52) U.S. Cl. .................... 710/36; 710/268; 711/163
(58) Field of Classification Search ............... 710/36, 710/268; 711/163
See application file for complete search history.

(56) References Cited

U.S. PATENT DOCUMENTS 4,876,600 A * 10/1989 Pietzsch et al. ............. 348/588
5,974,519 A * 10/1999 Cho ............................ 711/202
2005/0052280 A1 * 3/2005 Fukushima et al. ...... 340/425.5

FOREIGN PATENT DOCUMENTS

| JP | 5-189264 | 7/1993 |
| JP | 6-338551 | 12/1994 |
| JP | 9-305413 | 11/1997 |

* cited by examiner

*Primary Examiner*—Alford W Kindred
*Assistant Examiner*—Zachary K Huson
(74) *Attorney, Agent, or Firm*—Staas & Halsey LLP (57) ABSTRACT

A peripheral circuit control register has a plurality of bits corresponding respectively to peripheral resources. A decoder activates an access signal to the peripheral resource at an access destination when the bit corresponding to the peripheral resource at the access destination in the peripheral circuit control register is under a set state in response to occurrence of access to any of the peripheral resources by a CPU. A functional specification of an evaluation chip can be made equivalent to those of product chips and development of a wrong user program can be prevented by setting in advance the bits of the peripheral circuit control register corresponding to the peripheral resources mounted to the product chip to the set state.

12 Claims, 7 Drawing Sheets

MICROCONTROLLER

CROSS-REFERENCE TO RELATED APPLICATIONS

This application is based upon and claims the benefit of priority from Japanese Patent Application No. 2005-007546, filed on Jan. 14, 2005, the entire contents of which are incorporated herein by reference.

BACKGROUND OF THE INVENTION

1. Field of the Invention

This invention relates to a microcontroller. More particularly, the invention relates to an evaluation chip for trial production and evaluation developed for program developers and system board designers.

2. Description of the Related Art

An evaluation chip is generally provided as a device for trial production and evaluation to program developers and system board designers using product chips of a microcontroller. In order to allow the evaluation chip to be used in common for a plurality of product chips (mass production chips) having mutually different functional specifications, a common evaluation chip having a functional specification that is the least common multiple of the functional specifications of the product chips has been developed. Because the common evaluation chip is so constituted as to comprehensively include the functional specifications of a plurality of product chips, a greater number of peripheral resources and memories than those of the product chip are mounted. A user program is developed by the use of such a common evaluation chip and the user program so developed is mounted to the product chip. In a microcontroller capable of executing an interrupt processing in accordance with an interrupt request from a peripheral resource, an interrupt number is assigned on the 1:1 basis to the interrupt request from the peripheral resource and an interrupt processing program corresponding to the interrupt number assigned to the interrupt request is executed in response to the interrupt request from the peripheral resource.

As a technology associated with the microcontroller, Japanese Unexamined Patent Application Publication No. Hei 5-189264 discloses a microcontroller including means for permitting an external apparatus to gain access to a functional block and means for inhibiting access by the external device to the functional block when an access inhibition signal is inputted. When the same address is assigned to a functional block 1 of a microcontroller A and to a functional block 2 of a microcontroller B in a system constituted by combining the microcontrollers A and B, too, for example, only the access by the external apparatus to the functional block 1 of the microcontroller A can be executed by inputting the access inhibition signal to the microcontroller B from the external apparatus.

In an evaluation chip of a microcontroller having an LCD controller driver function, Japanese Unexamined Patent Application Publication No. Hei 6-338551 discloses a technology that changes a capacity of a general purpose memory by a program of an emulator to secure address continuity between the general purpose memory and an LCD display memory, and changes an address of the LCD display memory in accordance with a set value of a register. Japanese Unexamined Patent Application Publication No. Hei 9-305413 discloses a microcontroller having an external input terminal for inputting a signal for switching a correspondence relation between an interrupt request and a vector address (start address of interrupt processing program). In such a microcontroller, a plurality of interrupt processing programs can be selectively executed by one interrupt request without executing rewrite of a program memory because a vector select signal from the external input terminal can switch the correspondence relation between the interrupt request and the vector address.

Incidentally, the common evaluation chip has those peripheral resources and memories which are not mounted to a certain product chip A but are mounted to another product chip B. Therefore, when a user program of the product chip A is developed by using the common evaluation chip, a program developer is likely to erroneously develop a user program using the functions of those peripheral resources and memories which are not mounted to the product chip A. When the user program erroneously developed in this way is mounted to the product chip A, the product chip A does not operate normally. To avoid this problem, it may be conceivable to provide an evaluation chip corresponding on the 1:1 basis to each product but the increase of the number of man-hour for development and the product cost will occur.

In the common evaluation chip, the number of peripheral resources mounted is greater than or equal to the number of product chips. Therefore, the number of interrupt requests from the peripheral resources is greater than the number of product chips, too. When the interrupt number is assigned on the 1:1 basis to each interrupt request from the peripheral resources in the common evaluation chip, continuity of the interrupt numbers in the product chip may be lost in some cases because the interrupt numbers assigned to the interrupt requests from the peripheral resources not mounted exist depending on the product chips. Particularly when a vector table system that designates the start address of the interrupt processing program to each interrupt number is employed, an area corresponding to the interrupt number not used in the program memory becomes a free space when a discontinuous interrupt number is assigned to the interrupt request from the peripheral resource in the product chip and the program memory is consumed in vain. It may be possible to assign interrupt numbers that are different between the common evaluation chip and the product chip to secure continuity of the interrupt numbers, a program containing an erroneous setting processing may be sometimes mounted to product chip.

SUMMARY OF THE INVENTION

It is an object of the invention to prevent development of a wrong program when a user program is developed by using an evaluation chip. It is another object of the invention to secure continuity of interrupt numbers in a product chip and to avoid useless consumption of a program memory even when a vector table system is employed.

In a microcontroller according to a first aspect of the invention, the microcontroller is, for example, an evaluation chip that comprehensively includes functional specifications of a plurality of product chips and has a processing circuit and an access control circuit. The processing circuit operates in accordance with a program. A peripheral circuit control register has a plurality of bits respectively corresponding to a plurality of peripheral circuits. The access control circuit activates an access signal to the peripheral circuit at an access destination in response to occurrence of access to any of the plurality of peripheral circuits by the processing circuit when one of the bits corresponding to the peripheral circuit of the access destination in the peripheral circuit control register is under a set state. In other words, the access control circuit does not activate the access signal to the peripheral circuit of the access destination when the bit corresponding to the peripheral circuit of the access destination in the peripheral circuit control register is under a reset state. That is to say, access to the peripheral circuit by the processing circuit is not executed when the bit corresponding to the peripheral circuit of the access destination in the peripheral circuit control register is under the reset state.

Therefore, when a user program is developed by using the common evaluation chip to which the invention is applied, for example, the functional specifications of the evaluation chip associated with the peripheral circuits can be made equivalent to the functional specification of the product chip by setting the bit of the peripheral circuit control register corresponding to the peripheral circuits mounted to the product chip to the set state. As a result, it is possible to prevent a wrong user program containing an access processing by the processing circuit to the peripheral circuits not mounted to the product chip from being developed.

In a preferred example of the microcontroller according to the first aspect of the invention, a decode circuit of the access control circuit activates any of the access signals to the plurality of peripheral circuits in accordance with an access destination address representing the access destination of the processing circuit. A plurality of mask circuits is arranged to respectively correspond to the plurality of peripheral circuits. Each mask circuit masks the access signal to the corresponding peripheral circuit when the corresponding bit of the peripheral circuit control register is under the reset state. Consequently, the access control circuit for controlling the access signals to the peripheral circuits can be easily constituted.

In a preferred example of the microcontroller according to the first aspect of the invention, the microcontroller has a normal operation mode and a privileged operation mode. Here, the normal operation mode is a mode in which the processing circuit operates in accordance with the user program. The privileged operation mode is a mode in which the processing circuit operates in accordance with a program that is different from the normal operation mode. The access control circuit activates the access signal to the peripheral circuit control register in response to occurrence of the access to the peripheral circuit control register by the processing circuit in the privileged operation mode. In other words, the access control circuit does not activate the access signal to the peripheral circuit control register in the normal operation mode even when the access to the peripheral circuit control register by the processing circuit occurs.

Therefore, the access to the peripheral circuit control register by the processing circuit is not executed in the normal operation mode and the set/reset state of the bits of the peripheral circuit control register is not changed. As a result, it is possible to prevent the set/reset state of each bit of the peripheral circuit control register from being erroneously changed by the user program at the time of development of the user program and equivalency of the functional specification between the product chip and the evaluation chip from being lost. Therefore, development of the wrong user program can be more reliably prevented.

In a microcontroller according to a second aspect of the invention, the microcontroller is, for example, an evaluation chip that comprehensively includes functional specifications of a plurality of product chips and has a processing circuit, a memory, a memory control register and an access control circuit. The processing circuit operates in accordance with a program. The memory control register designates an access area of the memory. The access control circuit outputs an access signal to the memory in response to occurrence of access of the memory by the processing circuit when an access destination is contained in the access area designated by the memory control register. In other words, the access control circuit does not activate the access signal to the memory when the access destination is not contained in the access area designated by the memory control register. That is, access to the memory by the processing circuit is not executed when the access destination of the processing circuit is not contained in the access area designated by the memory control register.

Therefore, when a user program is developed by using the common evaluation chip to which the invention is applied, for example, the functional specifications of the evaluation chip associated with the memory can be made equivalent to the functional specification of the product chip by setting the access area corresponding to the capacity of the memory mounted to the product chip to the memory control register. As a result, it is possible to prevent a wrong user program containing an access processing to the memory area other than the access area corresponding to the capacity of the memory mounted to the product chip from being developed.

In a preferred example of the microcontroller according to the second aspect of the invention, first and second registers of the memory control register respectively designate start and end addresses of the access area of the memory. A comparison circuit of the access control circuit respectively compares an access destination address representing the access destination of the processing circuit with the addresses designated by the first and second registers, and then activates the access signal to the memory when the access destination address is greater than or equal to the address designated by the first register and is smaller than or equal to the address designated by the second register. Consequently, the access control circuit for controlling the access signal to the memory can be easily constituted.

In the preferred example of the microcontroller according to the second aspect of the invention, the first register of the memory control register designates the start address of the access area of the memory. The comparison circuit of the access control circuit respectively compares the access destination address representing the access destination of the processing circuit with the addresses designated by the first register and the end address of the memory, and then activates the access signal to the memory when the access destination address is greater than or equal to the address designated by the first register and is smaller than or equal to the end address of the memory. Consequently, the access control circuit for controlling the access signal to the memory can be easily constituted.

In the preferred example of the microcontroller according to the second aspect of the invention, the second register of the memory control register designates the end address of the access area of the memory. The comparison circuit of the access control circuit respectively compares the access destination address representing the access destination of the processing circuit with the start address of the memory and the address designated by the second register and then activates the access signal to the memory when the access destination address is greater than or equal to the start address of the memory and is smaller than or equal to the address designated by the second register. Consequently, the access control circuit for controlling the access signal to the memory can be easily constituted.

In the preferred example of the microcontroller according to the second aspect of the invention, the microcontroller has the normal operation mode and the privileged operation mode in the same way as in the first aspect. The access control circuit activates the access signal to the memory control register in response to occurrence of the access to the memory control register by the processing circuit in the privileged operation mode. In other words, the access control circuit does not activate the access signal to the memory control register in the normal operation mode even when the access to the memory control register by the processing circuit occurs.

Therefore, the access to the memory control register by the processing circuit is not executed in the normal operation mode and the access area designated by the memory control register is not changed. As a result, it is possible to prevent the access area designated by the memory control register from being erroneously changed by the user program at the time of development of the user program and equivalency of the functional specification between the product chip and the evaluation chip from being lost. Therefore, development of the wrong user program can be more reliably prevented.

In a microcontroller according to a third aspect of the invention, the microcontroller is, for example, an evaluation chip so constituted as to comprehensively include functional specifications of a plurality of chips and has a plurality of peripheral circuits, an interrupt request control register, an interrupt request substitution circuit and a processing circuit. The plurality of peripheral circuits respectively outputs a first interrupt request. The interrupt request control register designates a correspondence relation among the first interrupt requests from the plurality of peripheral circuits and a plurality of second interrupt requests. The interrupt request substitution circuit substitutes the plurality of second interrupt requests for the first interrupt request from the plurality of peripheral circuits and outputs the interrupt request in accordance with the correspondence relation designated by the interrupt request control register. The processing circuit operates in accordance with a program and executes any of a plurality of interrupt processing corresponding respectively to the plurality of second interrupt requests in accordance with the plurality of second interrupt requests.

Therefore, when a user program is developed by using the common evaluation chip to which the invention is applied, for example, continuity of the interrupt numbers in the product chips can be secured by setting the correspondence relation designated by the interrupt request control register so that the first interrupt requests from the plurality of peripheral circuits mounted to the product chips can be replaced by the plurality of second interrupt requests that are recognized by the processing circuit during the execution of the interrupt processing and continue one another. As a result, it is possible to prevent useless consumption of the program memory even when the vector table system is employed.

In the preferred example of the microcontroller according to the third aspect of the invention, a plurality of sub-registers of the interrupt request control register are arranged to respectively correspond to the plurality of second interrupt requests and designate any of the first interrupt requests from the plurality of peripheral circuits. A plurality of selection circuits of the interrupt request substitution circuit is arranged to respectively correspond to the plurality of interrupt requests. Each selection circuit outputs the first interrupt request designated by the corresponding sub-register as the corresponding second interrupt request.

Therefore, continuity of the interrupt numbers in the product chip can be secured by setting the plurality of sub-registers at the time of development of the user program so that the first interrupt requests from the plurality of peripheral circuits mounted to the product chip at the time of development of the user program can be respectively selected by the plurality of selection circuits respectively corresponding to the plurality of second interrupt requests the interrupt numbers of which continue one another.

In the preferred example of the microcontroller according to the third aspect of the invention, the plurality of sub-registers of the interrupt request control register is arranged to respectively correspond to the first interrupt requests from the plurality of peripheral circuits. Each sub-register has a plurality of bits respectively corresponding to the plurality of second interrupt requests. A plurality of assignment circuits of the interrupt request substitution circuit is arranged to respectively correspond to the first interrupt requests from the plurality of peripheral circuits. Each assignment circuit outputs the corresponding first interrupt request as the third interrupt request corresponding to the bit under the set a state in the corresponding sub-register among a plurality of third interrupt requests respectively corresponding to the plurality of second interrupt requests. A plurality of synthesis circuits of the interrupt request substitution circuit is arranged to respectively correspond to the plurality of second interrupt requests. Each synthesis circuit outputs in common the plurality of third interrupt requests corresponding to the same second interrupt request among the third interrupt requests from the plurality of assignment circuits as the corresponding second interrupt request.

Therefore, continuity of the interrupt numbers in the product chip can be secured by setting the plurality of sub-registers at the time of development of the user program so that the first interrupt requests from the plurality of peripheral circuits mounted to the product chip can be respectively inputted to the synthesis circuits respectively corresponding to the plurality of second interrupt requests the interrupt numbers of which continue one another. Also, one first interrupt request can be outputted as a plurality of second interrupt requests by setting all of the plurality of bits of the same sub-register to the set state. Therefore, all the first interrupt requests from the peripheral circuits can be outputted as the second interrupt requests when the number of the first interrupt requests from the peripheral circuits mounted to the product chip is greater than or equal to the number of the second interrupt requests, too.

In the preferred example of the microcontroller according to the third aspect of the invention, the microcontroller has a normal operation mode and a privileged operation mode in the same way as in the first aspect. The access control circuit fixes the access signal to the interrupt request control register to an inactive level during the normal operation mode. In other words, the access control circuit does not activate the access signal to the interrupt request control register in the normal operation mode even when the access to the interrupt request control register by the processing circuit occurs. The access control circuit activates the access signal to the interrupt request control register in response to occurrence of the access to the interrupt request control register by the processing circuit during the privileged operation mode.

Therefore, the access to the interrupt request control register by the processing circuit is not executed during the normal operation mode and the correspondence relation designated by the interrupt request control register is not changed. As a result, it is possible to more reliably prevent the correspondence relation designated by the interrupt request control register from being erroneously changed by the user program at the time of development of the user program and continuity of the interrupt numbers in the product chip from being lost.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENTS

Figure 1:
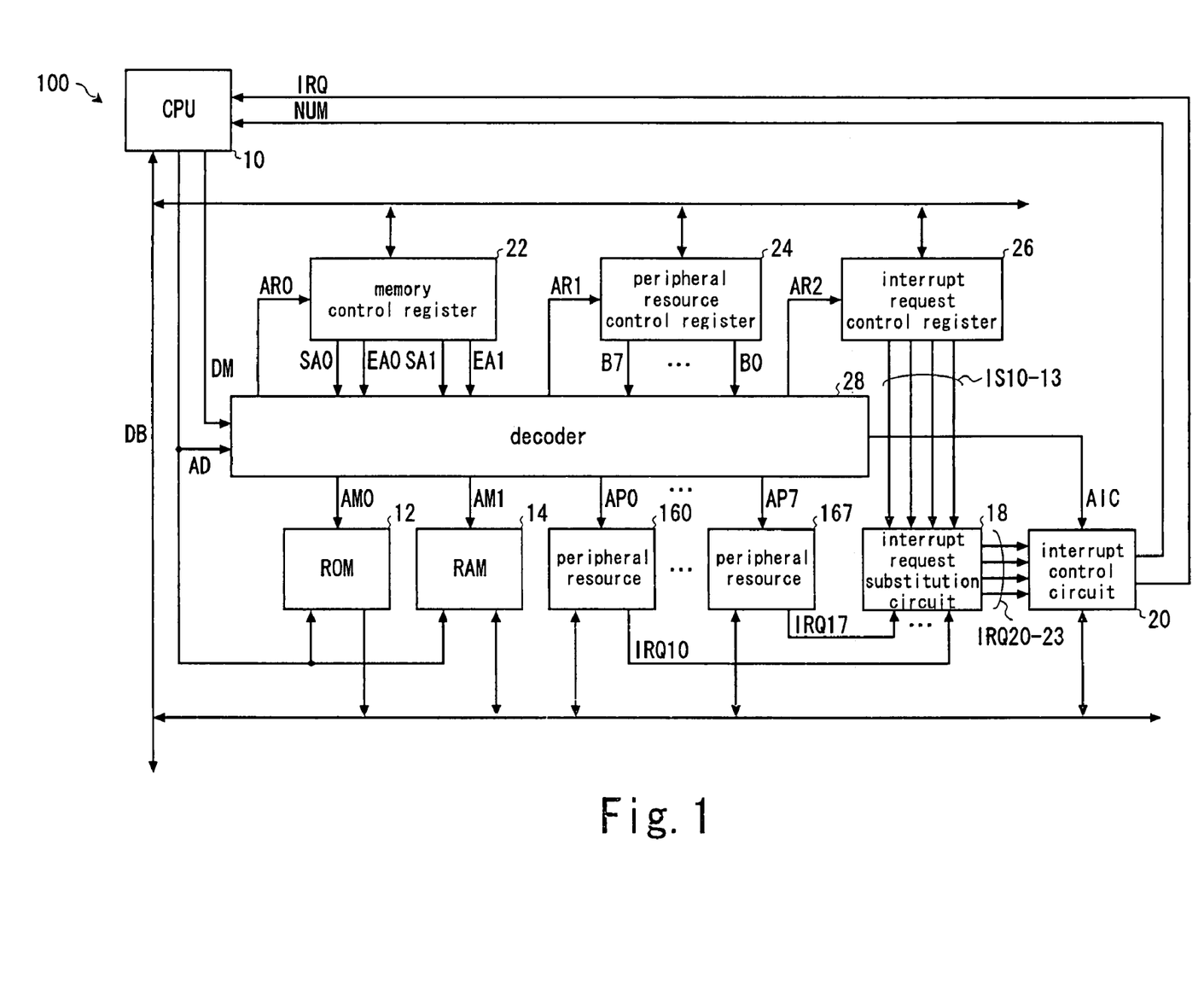
FIG. 1 is a block diagram showing a microcontroller according to a first embodiment of the invention.

Preferred embodiments of the invention will be hereinafter explained with reference to the accompanying drawings. FIG. 1 shows a microcontroller according to the first embodiment of the invention. The microcontroller 100 is, for example, a common evaluation chip having functional specifications of a plurality of product chips. The microcontroller 100 includes a CPU 10 (processing circuit), an ROM 12 (flash memory, for example) for storing various data such as a user program executed by the CPU 10 in the product chips, an RAM 14 for temporarily storing various data such as a computation result of the CPU 10, eight peripheral resources 160 to 167 (peripheral circuits), an interrupt request substitution circuit 18, an interrupt control circuit 20, a memory control register 22, a peripheral resource control register 24 (peripheral circuit control register), an interrupt request control register 26 and a decoder 28 (access control circuit).

The microcontroller 100 has a user mode (normal operation mode) in which the CPU 10 operates in accordance with the user program and a debug mode (privileged operation mode) in which the CPU 10 operates in accordance with a debug program. The microcontroller 100 has, for example, an interface circuit (not shown in the drawings) for an emulator and can exchange the data with the emulator through the interface circuit. A program developer develops the user program to be mounted to the product chip by using the emulator.

The CPU 10 executes various processing (commands) in accordance with the user program on the emulator side in the user mode. The CPU 10 executes various processing in accordance with the debug program on the emulator side in the debug mode. The CPU 10 activates a debug mode signal DM in the debug mode. In other words, the debug signal DM is fixed to an inactive level in the normal operation mode. The CPU 10 changes an address signal AD to a level representing an address of an access destination during an access processing and activates either one of a write signal and a read signal (both being not shown) in accordance with access content. The CPU 10 is connected to the ROM 12, the RAM 14, the peripheral resources 160 to 167, the interrupt control circuit 20, the memory control register 22, the peripheral resource control register 24 and the interrupt request control register 26 through the data bus DB and can exchange the data with these constituents. The CPU 10 executes an interrupt processing corresponding to an interrupt number represented by an interrupt number signal NUM in response to activation of the interrupt request signal IRQ outputted from the interrupt control circuit 20.

The microcontroller 100 employs a vector table system, for example. Therefore, the CPU 10 refers to a vector table inside the user program in response to activation of the interrupt request signal IRQ and acquires a vector address (start address of interrupt processing program) corresponding to the interrupt number represented by the interrupt number signal NUM. The CPU 10 executes the interrupt processing in accordance with the interrupt processing program of the vector address so acquired. Incidentally, the microcontroller 100 may employ a system in which the vector address corresponding to the interrupt number is fixed in place of the vector table system.

The peripheral resources 160 to 167 are those circuits which have a timer function, a communication interface function, and so forth. The peripheral circuits 160 to 167 respectively activate the interrupt request signals IRQ10 to IRQ17 (first interrupt request) when predetermined conditions are satisfied. The interrupt request substitution circuit 18 substitutes, in accordance with register value signals IS10 to IS13 outputted from the interrupt request control register 26, interrupt request signals IRQ20 to IRQ23 (second interrupt request) for the interrupt request signals IRQ10 to IRQ17 respectively outputted from the peripheral circuits 160 to 167, and outputs them to the interrupt control circuit 20. The interrupt control circuit 20 changes the interrupt number signal NUM to the CPU 10 to the level representing the interrupt number assigned in advance to the activated interrupt request signal in response to activation of the interrupt request signals IRQ20 to IRQ23 outputted from the interrupt request substitution circuit 18 and activates the interrupt request signal IRQ to the CPU 10.

The memory control register 22 outputs to the decoder 28 a start address signal SA0 and an end address signal EA0 representing respectively a start address and an end address of an access area of the ROM 12 and a start address signal SA1 and an end address signal EA1 representing respectively a start address and an end address of an access area of the RAM 14. The peripheral resource control register 24 has eight bits corresponding respectively to the peripheral resources 160 to 167 and outputs a bit value of each bit as a bit value signal B0 to B7 to the decoder 28. The detail of the memory control register 22 and the peripheral resource control register 24 will be explained with reference to FIG. 2. The interrupt request control register 26 outputs the register value signals IS10 to IS13 to the interrupt request substitution circuit 18. The detail of the interrupt request control register 26 will be explained with the interrupt request substitution circuit 18 with reference to FIG. 3.

The decoder 28 activates an access signal AR0 to the memory control register 22, an access signal AR1 to the peripheral resource control register 24 and an access signal AR2 to the interrupt request control register 26, respectively, on the basis of the address signal AD and the debug mode signal DM that are outputted from the CPU 10. The decoder 28 activates an access signal AM0 to the ROM 12 on the basis of the address signal AD and the start address signal SA0 and the end address signal EA0 that are outputted from the memory control register 22. The decoder 28 activates an access signal AM1 to the RAM 14 on the basis of the address signal AD and the start address signal SA1 and the end address signal EA1 that are outputted from the memory control register 22. The decoder 28 activates access signals AP0 (AP1 to AP7) to the peripheral resource 160 (161 to 167) on the basis of the address signal AD and the bit value signal B0 (B1 to B7) that is outputted from the peripheral resource control register 24. The decoder 28 activates an access signal AIC to the interrupt control circuit 20 on the basis of the address signal AD.

The ROM 12 outputs the data of the address indicated by the address signal AD outputted from the CPU 10 to the CPU 10 through the data bus DB during activation of the access signal AM0 outputted from the decoder 28 and during activation of the read signal outputted from the CPU10. The RAM 14 outputs the data of the address indicated by the address signal AD outputted from the CPU 10 to the CPU 10 through the data bus DB during activation of the access signal AM1 and during activation of the read signal outputted from the CPU 10.

The peripheral circuits 160 to 167 and the interrupt control circuit 20 respectively store the data outputted from the CPU 10 into internal registers through the data bus DB during activation of the access signal outputted to them from the decoder 28 and during activation of the write signal outputted from the CPU 10. The peripheral circuits 160 to 167 and the interrupt control circuit 20 respectively output the data of internal registers to the CPU 10 through the data bus DB during activation of the access signal outputted to them from the decoder 28 and during activation of the read signal outputted from the CPU 10.

Figure 2:
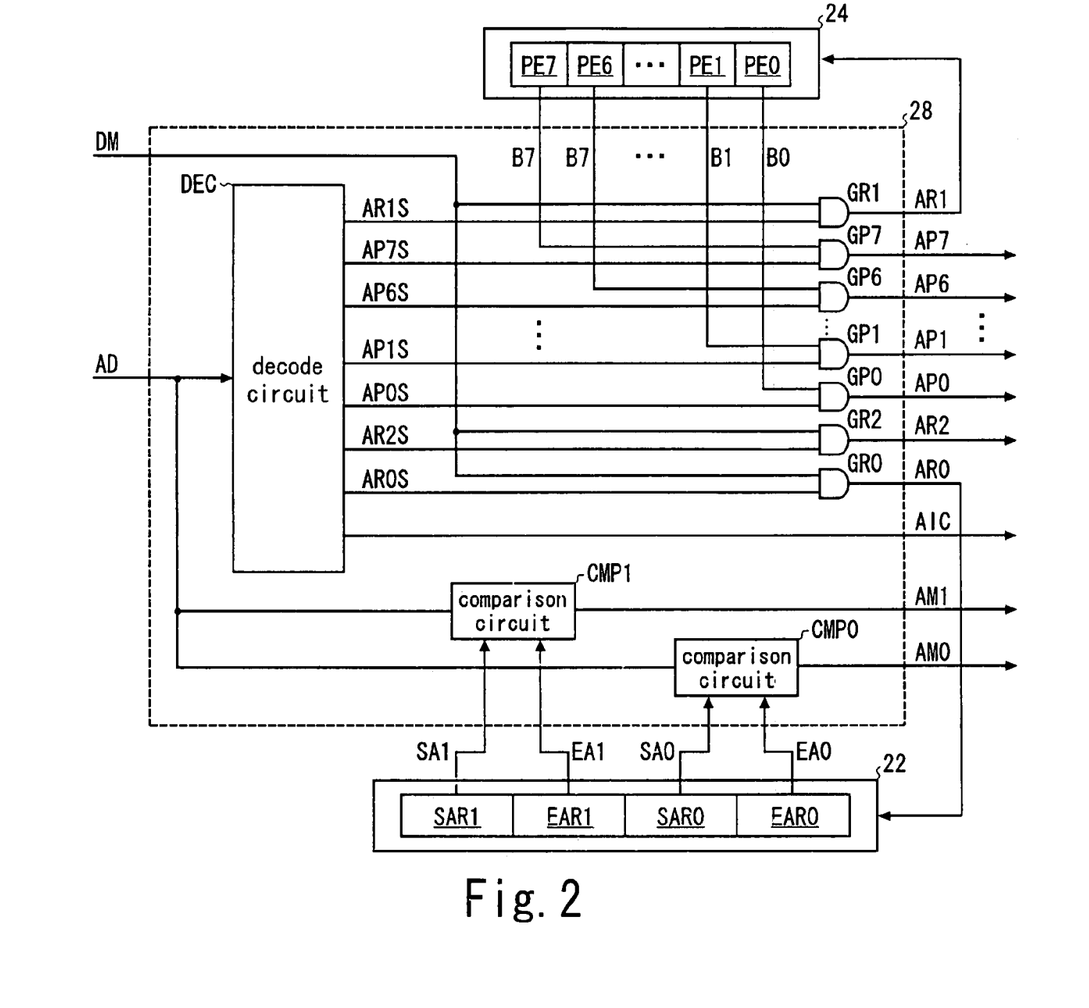
FIG. 2 is a block diagram showing a memory control register, a peripheral resource control register, and a decoder shown in FIG. 1.

FIG. 2 shows the memory control register 22, the peripheral resource control register 24 and the decoder 28 that are shown in FIG. 1. The memory control register 22 has registers SAR0 and EAR0 respectively designating the start address and the end address of the access area of the ROM 12 and registers SAR1 and EAR1 respectively designating the start address and the end address of the access area of the RAM 14. The registers SAR0 and SAR1 (first registers) output the register values as the start address signals SA0 and SA1, respectively. The registers EAR0 and EAR1 (second registers) respectively output the register values as the end address signals EA0 and EA1. The peripheral resource control register 24 has bits PE0 to PE7 corresponding respectively to the peripheral resources 160 to 167 and respectively output the bit value of each bit as the bit value signal B0 to B7.

The decoder 28 has a decode circuit DEC, comparison circuits CMP0 and CMP1, AND circuits GP0 to GP7 (mask circuits) and AND circuits GR0 to FR2. The decode circuit DEC activates any of the access signals AM0S, AM1S, AP0S to AP7S and AR0S to AR2S in accordance with the address signal AD outputted from the CPU 10. More concretely, the decode circuit DEC activates the access signal AM0S (AM1S) to the high level when the address signal AD indicates the address assigned to the RMO 12 (RAM 14). The decode circuit DEC activates the access signals AP0S (AP1S to AP7S) to the high level when the address signal AD indicates the address assigned to the peripheral circuit 160 (161 to 167). The decode circuit DEC activates the access signals AR0S (AR1S to AR2S) to the high level when the address signal AD indicates the address assigned to the memory control register 22 (peripheral resource control register 24 and interrupt request control register 26). The decode circuit DEC activates the access signal AIC to the high level when the address signal AD indicates the address assigned to the interrupt control circuit 20.

The comparison circuit CMP0 activates the address signal AM0 when the address represented by the address signal AD is greater than the start address of the access area of the ROM 12 represented by the start address signal SA0 and smaller than the end address of the access area of the ROM 12 represented by the end address signal EA0. Similarly, the comparison circuit CMP1 activates the access signal AM1 when the address represented by the address signal AD is greater than the start address of the access area of the RAM 14 represented by the start address signal SA1 and smaller than the end address of the access area of the RAM 14 represented by the end address signal EA1. Therefore, the access signal AM0 (AM1) is not activated in the case where the address represented by the address signal AD is outside the range of the access area designated by the memory control register 22 when the address signal AD represents the address assigned to the ROM 12 (RAM 14). In other words, when the address represented by the address signal AD is outside the access area designated by the memory control register 22, the access of the CPU 10 to the ROM 12 (RAM 14) is not executed. In consequence, the functional specification of the evaluation chip about the ROM (RAM) is equivalent to that of the product chip when the start address and the end address within the access area corresponding to the capacity of the ROM (RAM) mounted to the product chip are set by the memory control register 22 by the debug program during the debug mode.

The AND circuit GR0 (GR1, GR2) outputs the access signal AR0S (AR1S, AR2S) outputted from the decode circuit DEC as the access signal AR0 (AR1, AR2) when the debug mode signal DM outputted from the CPU 10 is at the high level (logic "1"). In other words, the access signal AR0S (AR1S, AR2S) is masked by the AND circuit GR0 (GR1, GR2) when the debug mode signal DM is at the low level (logic "0"). Therefore, when the address signal AD represents the address assigned to the memory control register 22 (peripheral resource control register 24 and interrupt request control register 26) in the user mode, the access signal AR0 (AR1, AR2) is not activated. In otherwords, the access by the CPU to the memory control register 22 (peripheral resource control register 24 and interrupt request control register 26) is not executed in the user mode. That is to say, the register value of the memory control register 22 (peripheral resource control register 24 and interrupt request control register 26) is not changed in the user mode.

The AND circuit GP0 (GP1 to GP7) outputs the access signal AP0S (AP1S to AP7S) outputted from the decode circuit DEC as the access signal AP0 (AP1 to AP7) when the bit PE0 (PE1 to PE7) of the peripheral resource control register 24 is under the set state (logic "1"). In other words, the access signal AP0S (AP1S to AP7S) is masked by the AND circuit GP0 (GP1 to GP7) when the bit PE0 (PE1 to PE7) of the peripheral resource control register 24 is under the reset state (logic "1"). Therefore, the access signal AP0 (AP1 to AP7) is not activated when the address signal AD represents the address assigned to the peripheral resource 160 (161 to 167) in the case where the bit PE0 (PE1 to PE7) of the peripheral resource control register 24 is under the reset state. In other words, the access by the CPU 10 to the peripheral resource 160 (161 to 167) is not executed when the bit PE0 (PE1 to PE7) of the peripheral resource control register 24 is under the reset state. Consequently, the functional specification of the evaluation chip about the peripheral resource is equivalent to that of the product chip when the bits of the peripheral circuit control register 24 corresponding to the peripheral resource mounted to the product chip are set to the set state by the debug program during the debug mode.

Figure 3:
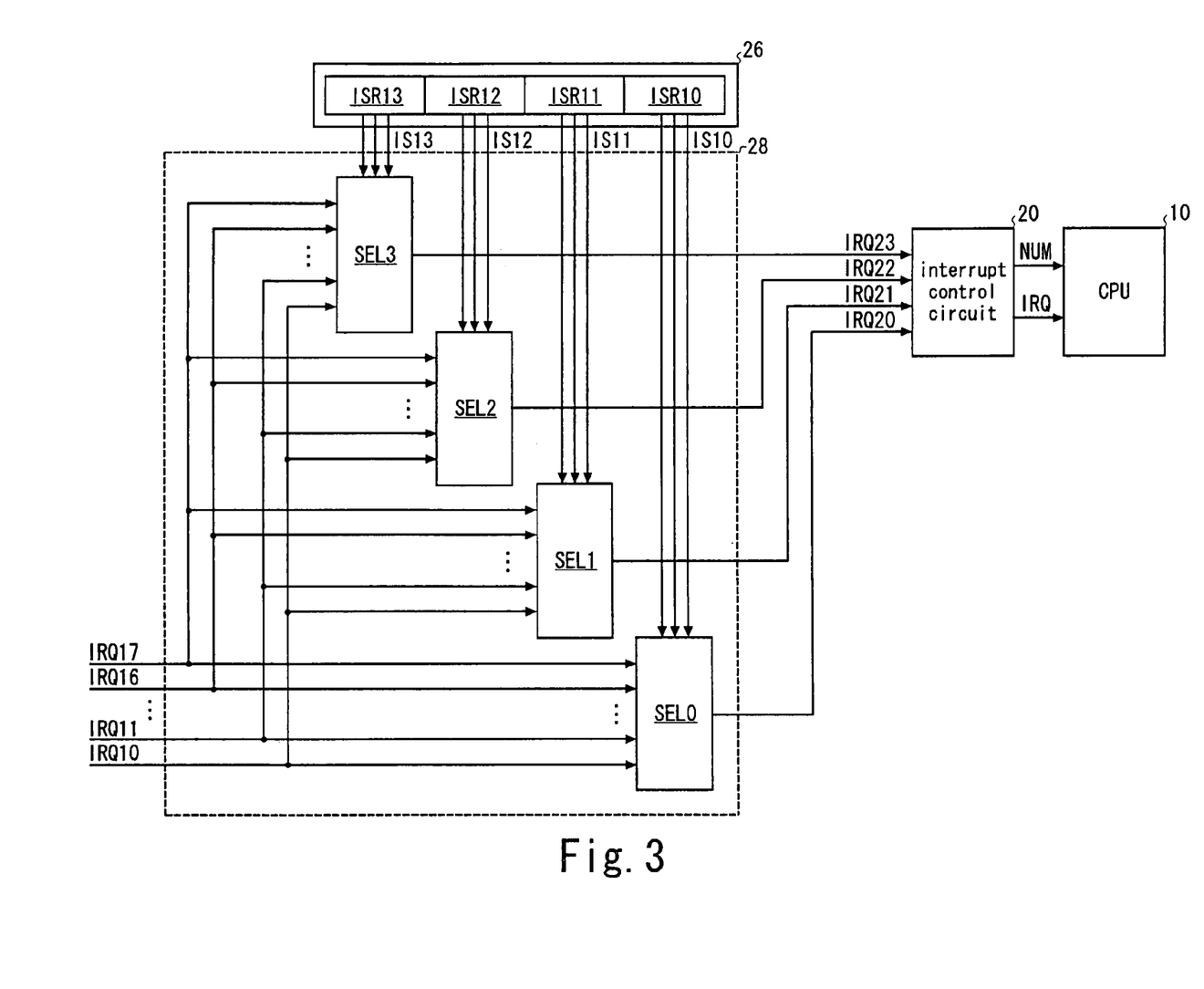
FIG. 3 is a block diagram showing an interrupt request substitution circuit and an interrupt request control register shown in FIG. 1.

FIG. 3 shows the interrupt request substitution circuit 18 and the interrupt request control register 26 shown in FIG. 1. The interrupt request control register 26 has three-bit registers ISR10 to ISR13 (sub-registers) corresponding respectively to the interrupt request signals IRQ20 to IRQ23 to the interrupt control circuit. The registers ISR10 to ISR13 output the register values as the register value signals IS10 to IS13, respectively. The interrupt request substitution circuit 18 has selectors SEL0 to SEL3 (selection circuits) corresponding respectively to the interrupt request signals IRQ20 to IRQ23 to the interrupt control circuit 20.

The selector SEL0 (SEL 1 to SEL3) outputs any of the interrupt request signals IRQ10 to IRQ17 from the peripheral resources 160 to 167 as the interrupt request signal IRQ20 (IRQ21 to IRQ23) in accordance with the register value signal IS10 (IS11 to IS13) outputted from the register ISR10 (ISR11 to ISR13). More concretely, the selector SEL0 (SE1 to SEL3) outputs the interrupt request signal IRQ1$n$ from the peripheral circuit 16$n$ as the interrupt request signal IRQ20 (IRQ21 to IRQ23) to the interrupt control circuit 20 when the register value (three bit) of the register ISR10 (ISR11 to ISR13) represents "n" of the decimal notation (n=0, 1, . . . , 7). Consequently, continuity of the interrupt number in the product chip can be secured by setting the register values of the registers ISR10 to ISR13 of the interrupt request control register 26 so that the interrupt request signals from a plurality of peripheral resources mounted to the product chips can be respectively selected by the selectors SEL0 to SEL3.

Figure 4:
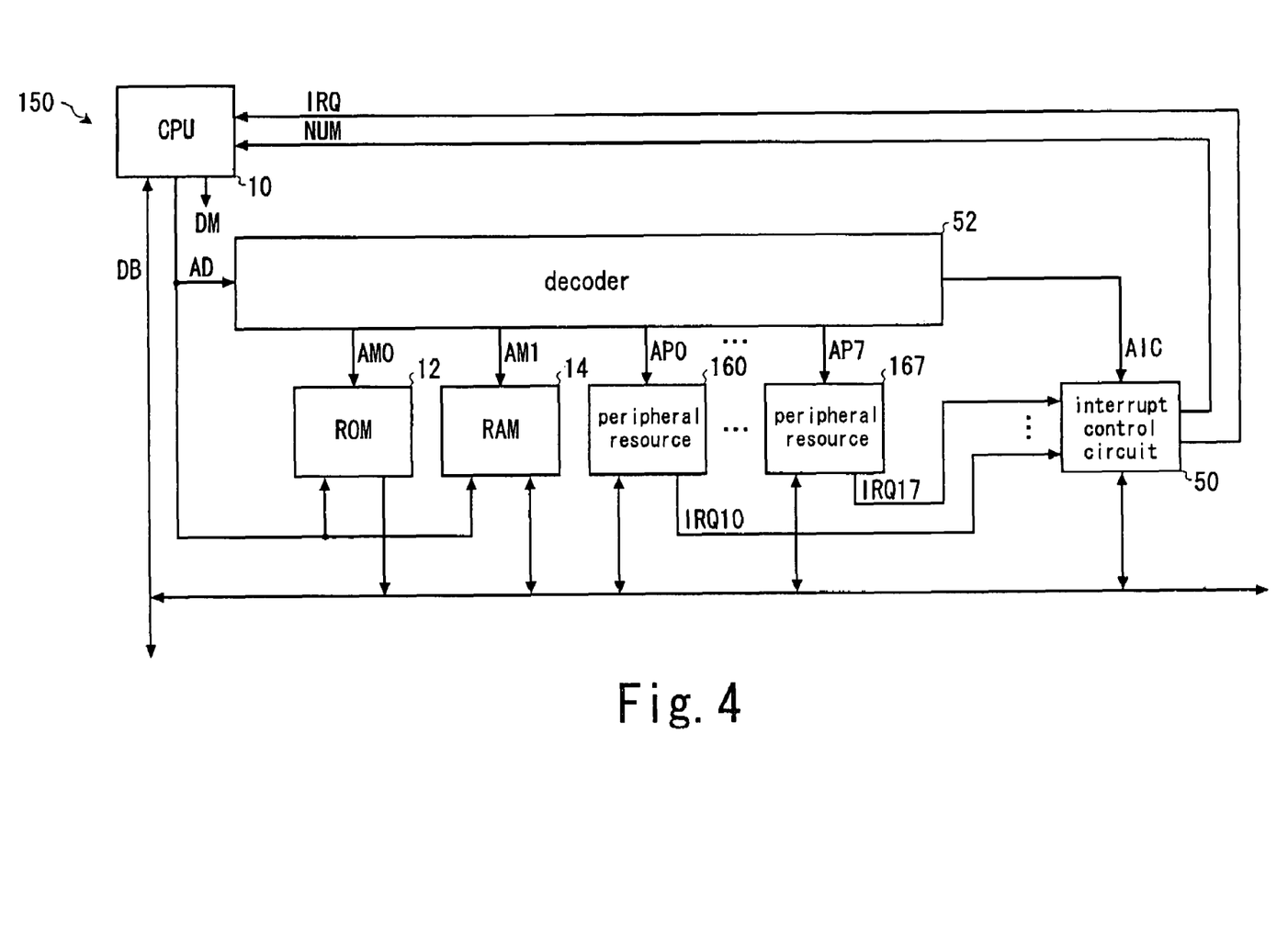
FIG. 4 is a block diagram showing a comparative example of the microcontroller shown in FIG. 1.

FIG. 4 shows a comparative example of the microcontroller 100 shown in FIG. 1. The same reference numeral will be assigned to the same element explained with reference to FIGS. 1 to 3 and its detailed explanation will be omitted. The microcontroller 150 is, for example, a common evaluation chip in the same way as the microcontroller 100. The microcontroller 150 has the CPU 10, the ROM 12, the RAM 14, the peripheral resources 160 to 167, the interrupt control circuit 50 and the decoder 52. The interrupt control circuit 50 changes the interrupt number signal NUM to the CPU 10 to the level representing the interrupt number assigned in advance to the activated interrupt request signal in response to activation of each interrupt request signal IRQ10 to IRQ17 outputted respectively from the peripheral resources 160 to 167 and activates the interrupt request signal IRQ to the CPU 10. The decoder 52 is functionally equivalent to the decode circuit DEC shown in FIG. 2.

In the microcontroller 150 having the construction described above, a program developer is likely to erroneously develop a user program using the functions of peripheral resources and memories not mounted to the product chip. The interrupt number is assigned on the 1:1 basis to each interrupt request IRQ10 to IRQ17 from the peripheral resource 160 to 167 and the interrupt number assigned to the interrupt request from the peripheral module not mounted exists depending on the product chip, so that continuity of the interrupt numbers in the product chip is likely to be lost. Therefore, when the vector table system is employed, the program memories are consumed in vain.

The first embodiment described above can make equivalent the functional specification associated with the peripheral resources of the evaluation chip and the functional specification associated with the ROM (or RAM) to those of the product chip at the time of development of the user program. It is therefore possible to prevent the development of the wrong program containing the access processing to the peripheral resources not mounted to the product chip or the access processing to the memory area other than the access area corresponding to the capacity of the ROM (or RAM) mounted to the product chip. It is also possible to prevent useless consumption of the program memory even when the vector table system is employed because continuity of the interrupt numbers in the product chip can be secured.

Because the register values of the memory control register 22, the peripheral resource control register 24 and the interrupt request control register 26 are not changed in the user mode, it is possible to prevent equivalency of the functional specification between the evaluation chip and the product chip from being lost when the register values of the memory control register 22, the peripheral resource control register 24 and the interrupt request control register 26 are erroneously changed by the user program.

Figure 5:
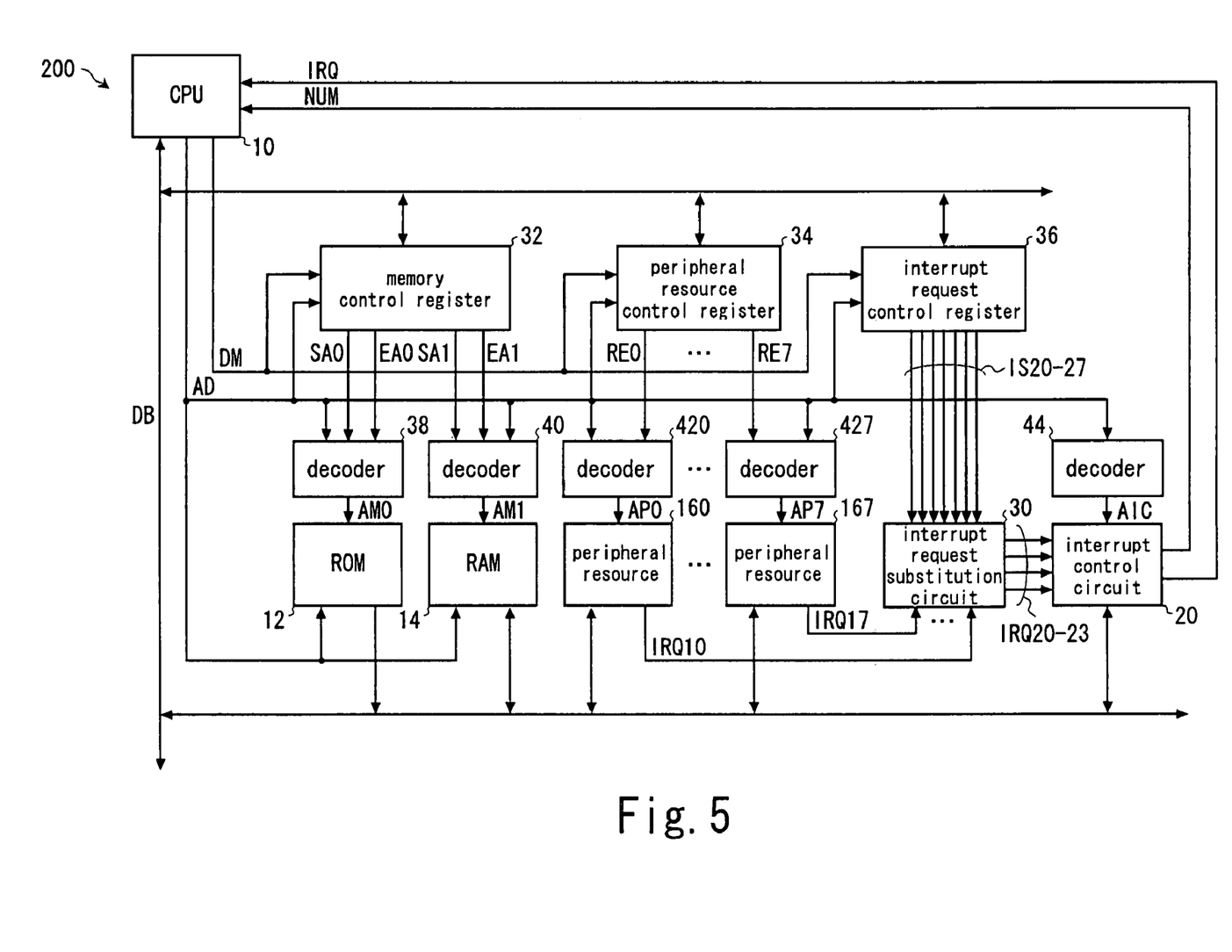
FIG. 5 is a block diagram showing a microcontroller according to a second embodiment of the invention.

FIG. 5 shows a microcontroller according to the second embodiment of the invention. In the explanation of the second embodiment, the same reference numeral will be assigned to the same element explained in the first embodiment and its detailed explanation will be omitted. The microcontroller 200 is, for example, a common evaluation chip in the same way as the microcontroller 100 in the first embodiment. The microcontroller 200 has the CPU 10, the ROM 12, the RAM 14, the peripheral resources 160 to 167, the interrupt request substitution circuit 30, the interrupt control circuit 20, the memory control register 32, the peripheral resource control register 34 and the interrupt request control register 36, the decoders 38, 40, 420 to 427 and 44.

The microcontroller 200 has the user mode in which the CPU 10 operates in accordance with the user program and the debug mode in which the CPU 10 operates in accordance with the debug program in the same way as the microcontroller 100. The microcontroller 200 has, for example, an interface circuit for emulation (not shown) in the same way as the microcontroller 100 and can exchange data with the emulator through this interface circuit. The interrupt request substitution circuit 30 substitutes the interrupt request signals IRQ10 to IRQ17 outputted respectively from the peripheral circuits 160 to 167 for the interrupt request signals IRQ20 to IRQ23 in accordance with the register value signals IS20 to IS27 outputted from the interrupt request control register 36 and outputs them to the interrupt control circuit 20. The detail of the interrupt request substitution circuit 30 will be explained with reference to FIG. 6.

The memory control register 32 is constituted by adding a decode circuit for realizing the function of generating the access signal AR0S in the decode circuit DEC and the AND circuit GR0 of the first embodiment to the memory control register 22 of the first embodiment. The peripheral resource control register 34 is constituted by adding a decode circuit for realizing the function of generating the access signal AR1S in the decode circuit DEC and the AND circuit GR1 of the first embodiment to the peripheral resource control register 24 of the first embodiment. The interrupt request control register 36 outputs the register value signals IS20 to IS27 to the interrupt request substitution circuit 18. The interrupt request control register 36 includes a decode circuit for realizing the function of generating the access signal AR2S in the decode circuit DEC and the AND circuit GR2 of the first embodiment.

The decoder 38 includes a decode circuit for realizing the function of generating the access signal AM0S in the decode circuit DEC of the first embodiment and the AND circuit GM0 of the first embodiment. The decoder 40 includes a decode circuit for realizing the function of generating the access signal AM1S in the decode circuit DEC and the AND circuit GM1 of the first embodiment. The decoder 420 (421 to 427) includes a decode circuit for realizing the function of generating the access signal AP0S (AP1S to AP7S) in the decode circuit DEC and the AND circuit GP0 (GP1 to GP7) of the first embodiment. The decoder 44 includes a decode circuit for realizing the function of generating the access signal AIC in the decode circuit DEC. Because each decoder is constituted in this way for each circuit, only a decoder corresponding to a circuit to be added needs be constituted afresh when the necessity for adding the peripheral resource and the memory arises and the addition of the circuit can be easily made.

Figure 6:
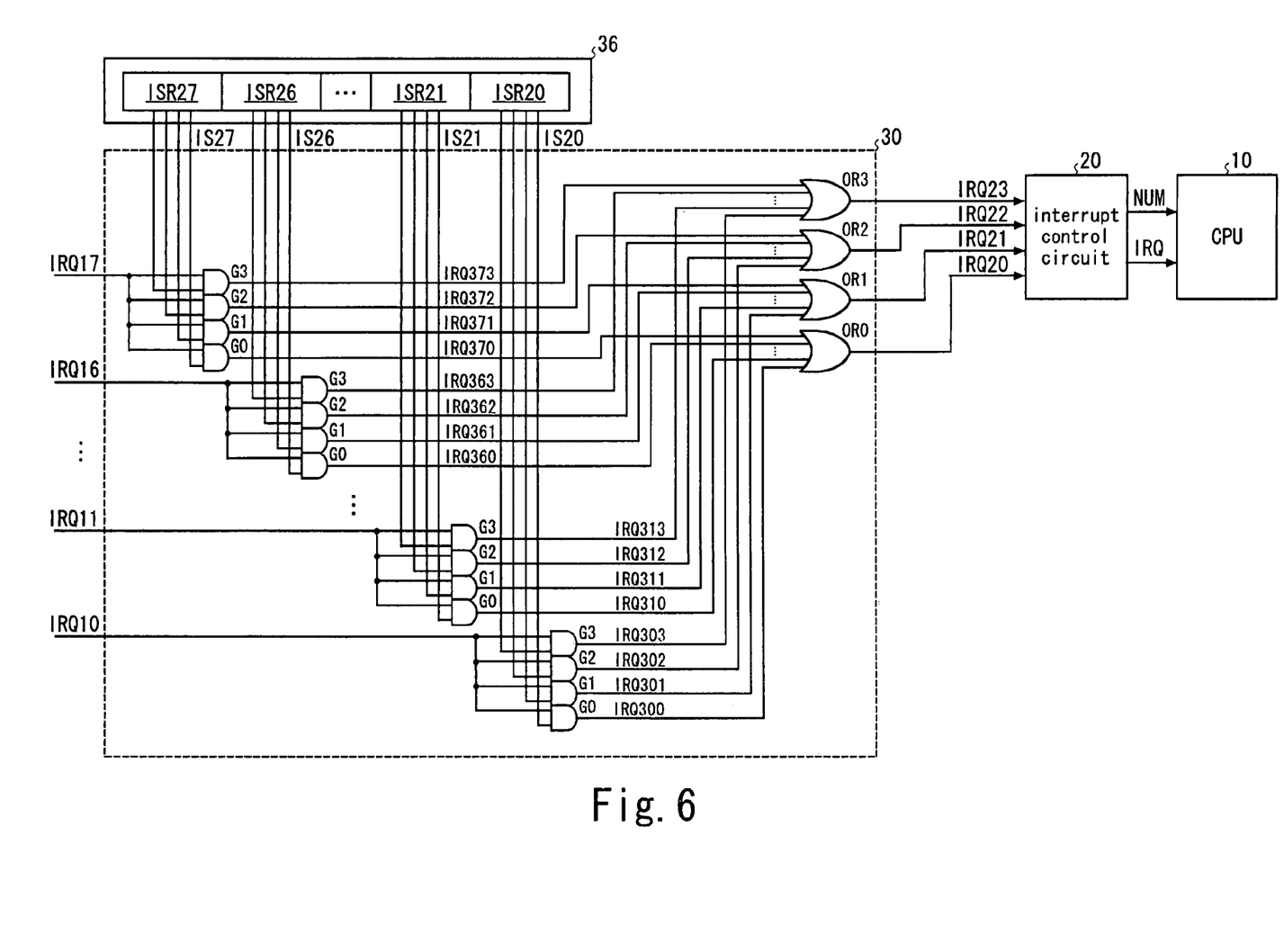
FIG. 6 is a block diagram showing an interrupt request substitution circuit and an interrupt request control register shown in FIG. 5.

FIG. 6 shows the interrupt request substitution circuit 30 and the interrupt request control register 36 shown in FIG. 5. The interrupt request control register 36 includes registers ISR20 to ISR27 (sub-registers) corresponding respectively to the interrupt request signals IRQ10 to IRQ17 outputted from the peripheral resources 160 to 167. The register IS20 (ISR21 to ISR27) has 4 bits corresponding respectively to the interrupt request signals IRQ20 to IRQ23 to the interrupt control circuit 20 and outputs the register values as the register value signals IS20 (IS21 to IS27).

The interrupt request substitution circuit 30 has a plurality of AND circuits G0 to G3 (assignment circuits) corresponding respectively to the interrupt request signals IRQ10 to IRQ17 outputted respectively from the peripheral resources 160 to 167 and OR circuits OR0 to OR3 (synthesis circuits) corresponding respectively to the interrupt request signals IRQ20 to IRQ23 to the interrupt control circuit 20.

The AND circuit G0 corresponding to the interrupt request signal IRQ10 outputs the interrupt request signal IRQ10 as the interrupt request signal IRQ300 (third interrupt request) to the OR circuit OR0 when the lowermost bit of the register ISR20 is under the set state, that is, when the lowermost signal of the register value signal IS20 is at the logic "1". The AND circuit G1 corresponding to the interrupt request signal IRQ10 outputs the interrupt request signal IRQ10 as the interrupt request signal IRQ301 to the OR circuit OR1 when the second lowermost bit of the register ISR20 is under the set state, that is, when the second lowermost signal of the register value signal IS0 is at the logic "1". The AND circuit G2 corresponding to the interrupt request signal IRQ10 outputs the interrupt request signal IRQ10 as the interrupt request signal IRQ302 to the OR circuit OR2 when the third lowermost bit of the register ISR20 is under the set state, that is, when the third lowermost signal of the register value signal IS0 is at the logic "1". The AND circuit G3 corresponding to the interrupt request signal IRQ20 outputs the interrupt request signal IRQ10 as the interrupt request signal IRQ303 to the OR circuit OR3 when the uppermost bit of the register ISR20 is under the set state, that is, when the uppermost signal of the register value signal IS0 is at the logic "1". The relation among each AND circuit G0 to G3 corresponding to the interrupt request signal IRQ11 (IRQ12 to IRQ17), each register ISR21 (ISR22 to ISR27) and each OR circuit OR0 to OR3 is the same as the relation among each AND circuit G0 to G3 corresponding to the afore-mentioned interrupt request signal IRQ10, the register ISR20 and each OR circuit OR0 to OR3.

The OR circuit OR0 (OR1, OR2, OR3) activates the interrupt request signal IRQ20 (IRQ21 to IRQ23) to the high level in response to activation of the interrupt request signals IRQ300 to IRQ370 (IRQ301 to IRQ371, IRQ302 to IRQ372, IRQ303 to IRQ373) outputted respectively from the eight AND circuits G0 (G1, G2, G3) corresponding to the interrupt request signals IRQ10 to IRQ17 to the high level. Therefore, continuity of the interrupt numbers in the product chip can be secured by setting the register values of the registers ISR20 to ISR23 of the interrupt request control register 26 so that the interrupt request signals from a plurality of peripheral resources mounted to the product chip can be inputted by the debug program to the OR circuits OR0 to OR3 in the debug mode.

Figure 7:
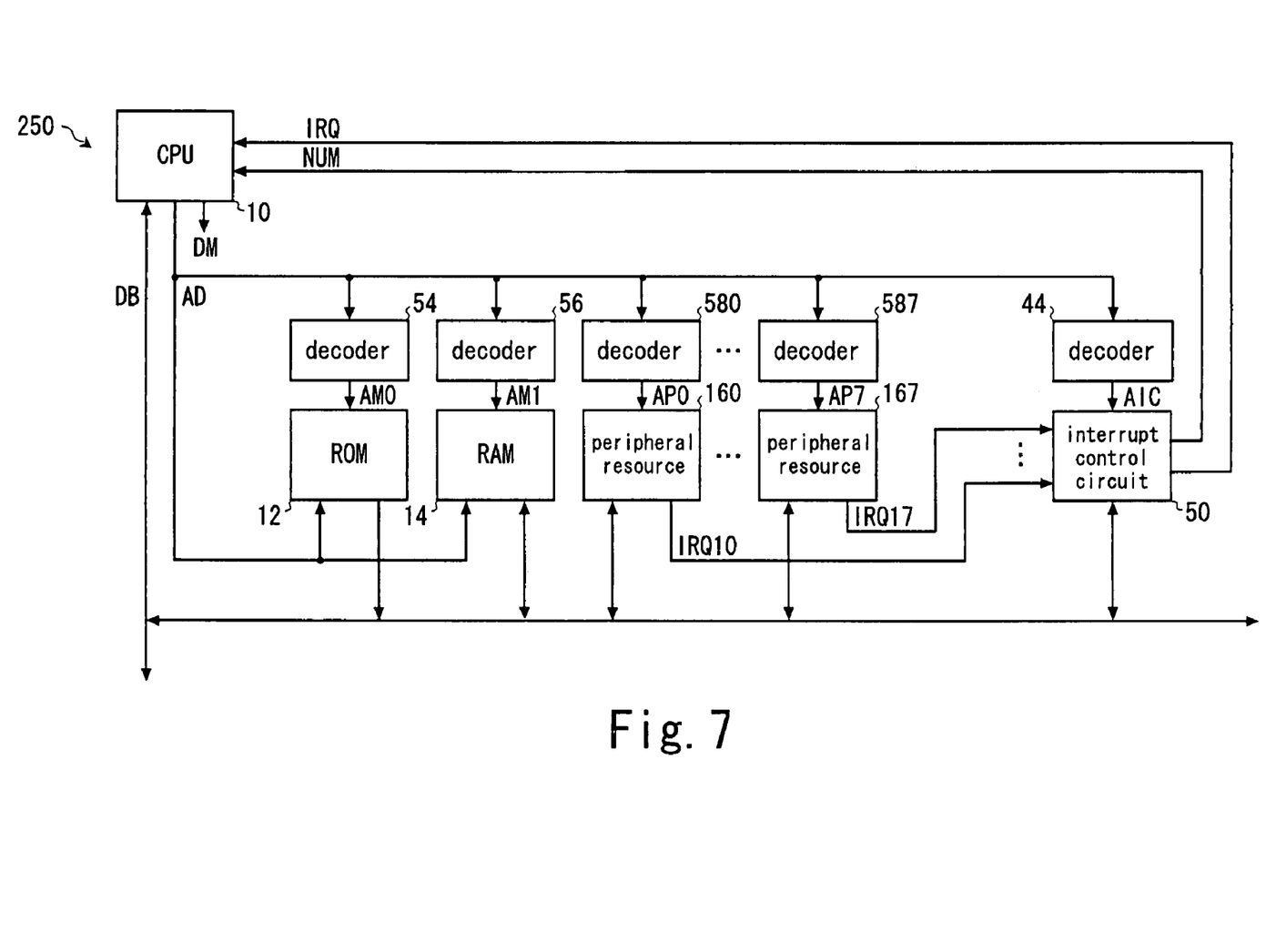
FIG. 7 is a block diagram showing a comparative example of the microcontroller shown in FIG. 5.

FIG. 7 shows a comparative example of the microcontroller 200 shown in FIG. 5. In the explanation of the comparative example of the microcontroller 200, the same reference numeral will be assigned to the same element explained with reference to FIGS. 1, 4 and 5 and its detailed explanation will be omitted. The microcontroller 250 is constituted by deleting the decoder 52 from the microcontroller 150 shown in FIG. 4 and adding the decoder 44 and the decoders 54, 56 and 580 to 587 shown in FIG. 5.

The decoder 54 has a decode circuit for realizing the function of generating the access signal AM0S in the decode circuit DEC in the first embodiment. The decoder 56 has a decode circuit for realizing the function of generating the access signal AM1S in the decode circuit DEC. The decoder 580 (581 to 587) has a decode circuit for realizing the function of generating the access signal AP0S (AP1S to AP7S) in the decode circuit DEC. Such a microcontroller 250 is the same as the microcontroller 150 shown in FIG. 4 with the exception of the portions associated with the decoder and involves the same problem as that of the microcontroller 150.

The second embodiment described above can acquire the same effect as that of the first embodiment. In addition, it is possible to output one interrupt request from the peripheral resource as a plurality of interrupt requests to the interrupt control circuit 20 by setting a plurality of bits inside the same register of the registers ISR20 to ISR27 of the interrupt request control register 36 to the set state. Therefore, even when the number of interrupt requests from the peripheral resources mounted to the product chip is greater than the number of interrupt requests to the interrupt control circuit 20, all the interrupt requests from the peripheral resource can be outputted as the interrupt request to the interrupt control circuit 20.

Incidentally, in the first and second embodiments, the explanation has been given about the case where the debug mode signal DM is outputted from the CPU 10, but the invention is not limited to such embodiments. For example, the debug mode signal DM may be outputted from the interface circuit for the emulator or other circuits which can identify the operation mode of the microcontroller.

In the first and second embodiments, the explanation has been given about the case where the memory control register has both registers SAR0 and EAR0 (SAR1 and EAR1) corresponding to the ROM 12 (RAM 14) but the invention is not limited to such embodiments. For example, the register SAR0 (SAR1) of the memory control register may be omitted when the start address of the ROM (RAM) is in common to the start address of the ROM 12 (RAM 14) though the capacity of the ROM (RAM) is mutually different in a plurality of product chips. The register EAR0 (EAR1) of the memory control register may be omitted when the end address of the ROM (RAM) is in common to the end address of the ROM 12 (RAM 14) though the capacity of the ROM (RAM) is mutually different in a plurality of product chips. Because any of the registers SAR0 and EAR0 (SAR1, EAR1) of the memory control register can be eliminated in these cases, the circuit scale of the memory control register can be decreased.

The invention is not limited to the above embodiments and various modifications may be made without departing from the spirit and scope of the invention. Any improvement may be made in part or all of the components.

What is claimed is:

1. A microcontroller being configured as a common evaluation chip that comprehensively includes functional specifications of a plurality of product chips, said microcontroller comprising:
   a processing circuit operating in accordance with a program;
   a plurality of peripheral circuits;
   a peripheral circuit control register having a plurality of bits corresponding to said plurality of peripheral circuits, respectively, among the plurality of bits a bit corresponding to a peripheral circuit mounted on the microcontroller and associated with a functional specification of one of the product chips being an object of program development is set under a set state and a bit corresponding to a peripheral circuit not associated with a functional specification of one of the product chips is set under a reset state, via an access by said processing circuit; and
   an access control circuit activating an access signal to the peripheral circuit to which the access by said processing circuit occurs when one of the bits in said peripheral circuit control register corresponding to the peripheral circuit is under a set state and not activating the access signal to the peripheral circuit to which the access by said processing circuit occurs when one of the bits in said peripheral circuit control register corresponding to the peripheral circuit is under a reset state, when the access to any of said peripheral circuits by said processing circuit occurs.

2. The microcontroller according to claim 1, wherein said access control circuit includes:
   a decode circuit activating any of access signals to said plurality of peripheral circuits in accordance with an access destination address representing an access destination of said processing circuit; and
   a plurality of mask circuits arranged to correspond to said plurality of peripheral circuits, respectively, and masking the access signals to corresponding peripheral circuits when corresponding bits in said peripheral circuit control register are under a reset state.

3. The microcontroller according to claim 1, wherein
   said access control circuit does not activate the access signal to said peripheral circuit control register even when the access to said peripheral circuit control register by said processing circuit occurs in a normal operation mode in which said processing circuit operates in accordance with a user program, and activates the access signal to said peripheral circuit control register in response to occurrence of the access to said peripheral circuit control register by said processing circuit in a privileged operation mode in which said processing circuit operates in accordance with a program different from said user program.

4. The microcontroller according to claim 3, further comprising:
   a memory; and a memory control register designating an access area of said memory, wherein the access control circuit activates an access signal to said memory in response to occurrence of access to said memory by said processing circuit when an access destination is contained in the access area designated by said memory control register.

5. The microcontroller according to claim 4, wherein:
   said memory control register has first and second registers respectively designating a start address and an end address of the access area of said memory; and
   said access control circuit has a comparison circuit respectively comparing an access destination address representing an access destination of said processing circuit with the addresses designated by said first and second registers, and then activating the access signal to said memory when said access destination address is greater than or equal to the address designated by said first register and is smaller than or equal to the address designated by said second register.

6. The microcontroller according to claim 4, wherein:
   said memory control register has a first register designating a start address of the access area of said memory; and
   said access control circuit has a comparison circuit respectively comparing an access destination address representing an access destination of said processing circuit with the address designated by said first register and an end address of said memory, and then activating the access signal to said memory when said access destination address is greater than or equal to the address designated by said first register and is smaller than or equal to the end address of said memory.

7. The microcontroller according to claim 4, wherein:
   said memory control register has a second register designating an end address of the access area of said memory; and
   said access control circuit has a comparison circuit respectively comparing an access destination address representing an access destination of said processing circuit with a start address of said memory and the address designated by said second register, and then activating the access signal to said memory when said access destination address is greater than or equal to the start address of said memory and is smaller than or equal to the address designated by said second register.

8. The microcontroller according to claim 4, wherein in said privileged operation mode, said access control circuit activates the access signal to said memory control register in response to occurrence of access to said memory control register by said processing circuit.

9. The microcontroller according to claim 3, wherein the plurality of peripheral circuits output first interrupt requests, respectively, and the microcontroller further comprises:
   an interrupt request control register designating a correspondence relation among the first interrupt requests from said plurality of peripheral circuits and a plurality of second interrupt requests; and
   an interrupt request substitution circuit substituting said plurality of second interrupt requests for said first interrupt requests from said plurality of peripheral circuits to output said second interrupt requests, in accordance with the correspondence relation designated by said interrupt request control register;
   wherein the processing circuit executes any of a plurality of interrupt processing corresponding to said plurality of second interrupt requests in accordance with said plurality of second interrupt requests.

10. The microcontroller according to claim 9, wherein:
    said interrupt request control register has a plurality of sub-registers arranged to respectively correspond to said plurality of second interrupt requests, and respectively designating any of the first interrupt requests from said plurality of peripheral circuits; and
    said interrupt request substitution circuit has a plurality of selection circuits arranged to respectively correspond to said plurality of second interrupt requests, and outputting the first interrupt requests designated by the corresponding sub-registers as corresponding second interrupt requests.

11. The microcontroller according to claim 9, wherein:
said interrupt request control register has a plurality of sub-registers arranged to respectively correspond to the first interrupt requests from said plurality of peripheral circuits, and having a plurality of bits corresponding to said plurality of second interrupt requests, respectively; and
said interrupt request substitution circuit includes
    a plurality of assignment circuits arranged to respectively correspond to the first interrupt requests from said plurality of peripheral circuits, and outputting the corresponding first interrupt request as a third interrupt request corresponding to the bit under a set state in the corresponding sub-register among a plurality of third interrupt requests respectively corresponding to said plurality of second interrupt requests, and
    a plurality of synthesis circuits arranged to respectively correspond to said plurality of second interrupt requests, and commonly outputting a plurality of third interrupt requests corresponding to a same second interrupt request, among the third interrupt requests from said plurality of assignment circuits as a corresponding second interrupt request.

12. The microcontroller according to claim 9, wherein the access control circuit fixes an access signal to said interrupt request control register to an inactive level in the normal operation mode in which said processing circuit operates in accordance with the user program, and activates the access signal to said interrupt request control register in response to occurrence of access to said interrupt request control register by said processing circuit in the privileged operation mode in which said processing circuit operates in accordance with a program different from the user program.

* * * * *

UNITED STATES PATENT AND TRADEMARK OFFICE
CERTIFICATE OF CORRECTION

PATENT NO.        : 7,624,205 B2
APPLICATION NO.   : 11/146237
DATED             : November 24, 2009
INVENTOR(S)       : Nobuhiko Akasaka It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 553 days.

Signed and Sealed this

Twenty-sixth Day of October, 2010

David J. Kappos
*Director of the United States Patent and Trademark Office*